(12) United States Patent
Oomori

(10) Patent No.: US 7,197,252 B2
(45) Date of Patent: Mar. 27, 2007

(54) OPTICAL TRANSMITTER AND OPTICAL COMMUNICATION SYSTEM

(75) Inventor: Hirotaka Oomori, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 679 days.

(21) Appl. No.: 10/630,798

(22) Filed: Jul. 31, 2003

(65) Prior Publication Data
US 2005/0025491 A1    Feb. 3, 2005

(51) Int. Cl.
*H04B 10/04* (2006.01)
*H04B 10/12* (2006.01)

(52) U.S. Cl. ............... 398/193; 398/192; 398/195; 398/197; 398/198

(58) Field of Classification Search ........... 398/192, 398/193, 195, 197, 198
See application file for complete search history.

(56) References Cited

U.S. PATENT DOCUMENTS

| 5,361,156 | A | 11/1994 | Pidgeon |
| 6,481,861 | B2 | 11/2002 | Cao et al. |
| 6,580,542 | B1* | 6/2003 | Song et al. ............... 398/147 |
| 2005/0185964 | A1* | 8/2005 | Ishikawa ............... 398/147 |

* cited by examiner

*Primary Examiner*—Jason Chan
*Assistant Examiner*—Nathan Curs
(74) *Attorney, Agent, or Firm*—McDermott Will & Emery LLP

(57) ABSTRACT

The optical transmitter has a feature that the transmitter comprises a light-emitting device, an optical splitter, a dispersion controller including a first dispersion generator and a waveform monitor, and a processing unit. The optical splitter splits light emitted from the light-emitting device, and guides one of split light into the first dispersion generator. The first dispersion generator adds dispersion, an amount of which is predefined by the processing unit so as to reflect dispersion of the optical path to the receiving station, to the split light and outputs dispersed light to the waveform monitor. The processing unit maintains the dispersed light output from the dispersion generator to have a predetermined quality.

6 Claims, 5 Drawing Sheets

39

39

OPTICAL TRANSMITTER AND OPTICAL COMMUNICATION SYSTEM

BACKGROUND OF THE INVENTION

1. Field of the Invention

The present invention relates to an optical transmitter and relates to an optical communication system containing such optical transmitter.

2. Related Background Art

A wavelength division multiplexing (WDM) system achieves high speed and high capacity communications by multiplexing a plurality of optical signals with different wavelengths on single optical fiber or the like. In the WDM system, the transmission route from a transmission station to a receiving station sometimes changes due to, for example, a breaking of the optical fiber or a switching of the receiving station, which causes to change the transmission distance. Since the elongation of the transmission distance results in a reduction of an optical signal and a deterioration of the waveform received at the receiving station, optical amplifiers to compensate the signal reduction are provided in the transmission path. Moreover, a plurality of decision circuits each having different decision levels to each other may be provided in the receiving station so as to maintain a reliable detection of the optical signal even when the reduction of the optical signal has occurred.

However, when the optical signal is extremely degraded, problems above mentioned still remain. Namely, the optical receiver at the receiving station can not recover received signals even when the optical amplifiers are placed in the transmission path and the optical receiver provides a plurality of detection circuits.

SUMMARY OF THE INVENTION

The present invention provides an optical transmitter that reduces a deterioration of transmitted optical signal at a receiving station due to elongation of an optical path, and an optical communication system that uses the optical transmitter.

The optical transmitter according to the present invention has a feature that the transmitter comprises a light-emitting device, an optical splitter, a dispersion controller including a first dispersion generator and a waveform monitor, and a processing unit. The optical splitter splits light emitted from the light-emitting device, and guides one of split light into the first dispersion generator. The first dispersion generator adds dispersion, an amount of which is predefined by the processing unit so as to reflect dispersion of the optical path to the receiving station, to the split light and outputs dispersed light to the waveform monitor. The processing unit maintains the dispersed light output from the dispersion generator to have a predetermined quality.

Since light output from the optical transmitter is pre-dispersed so as to compensate the dispersion of the optical transmission path, light received at the receiving station is kept with the predetermined quality. The waveform monitor may monitor the dispersed light as an eye-diagram, and the predetermined quality may be defined by an opening of the eye-diagram.

In the present invention, the light-emitting device may be a semiconductor laser diode and the processing unit may control the dispersion of the laser diode by controlling at least one of the bias current and the modulation current supplied to the laser diode.

Moreover, the optical transmitter of the present invention may have a second dispersion generator. The second dispersion generator adds dispersion to light emitted from the light-emitting device and outputs a dispersed light to the optical splitter. The processing unit may control the dispersion of the second dispersion generator so that the dispersed light from the first dispersion generator has the predetermined quality.

Another feature of the present invention relates to an optical transmission system. The transmission system comprises a transmitting station, a receiving station, at least two optical paths, and a central station. The transmitting station includes an optical transmitter, the receiving station includes an optical receiver, and at least two optical paths each connect the transmitting station and the receiving station. The central station detects that a fault occurs in one of the optical path and the other optical path is selected, sends dispersion based on the other optical path to the transmitting station. The transmitter in the transmitting station outputs pre-dispersed light so as to compensate the dispersion based on the other of the optical path.

Since light output from the optical transmitter is pre-dispersed so as to compensate the dispersion of the optical transmission path, light received at the receiving station is kept with the predetermined quality. The waveform monitor may monitor the dispersed light as an eye-diagram, and the predetermined quality may be defined by an opening of the eye-diagram.

DETAILED DESCRIPTION OF THE INVENTION

Preferred embodiment of the present invention will be described in detail as referring accompanied drawings.

First Embodiment

Figure 1:
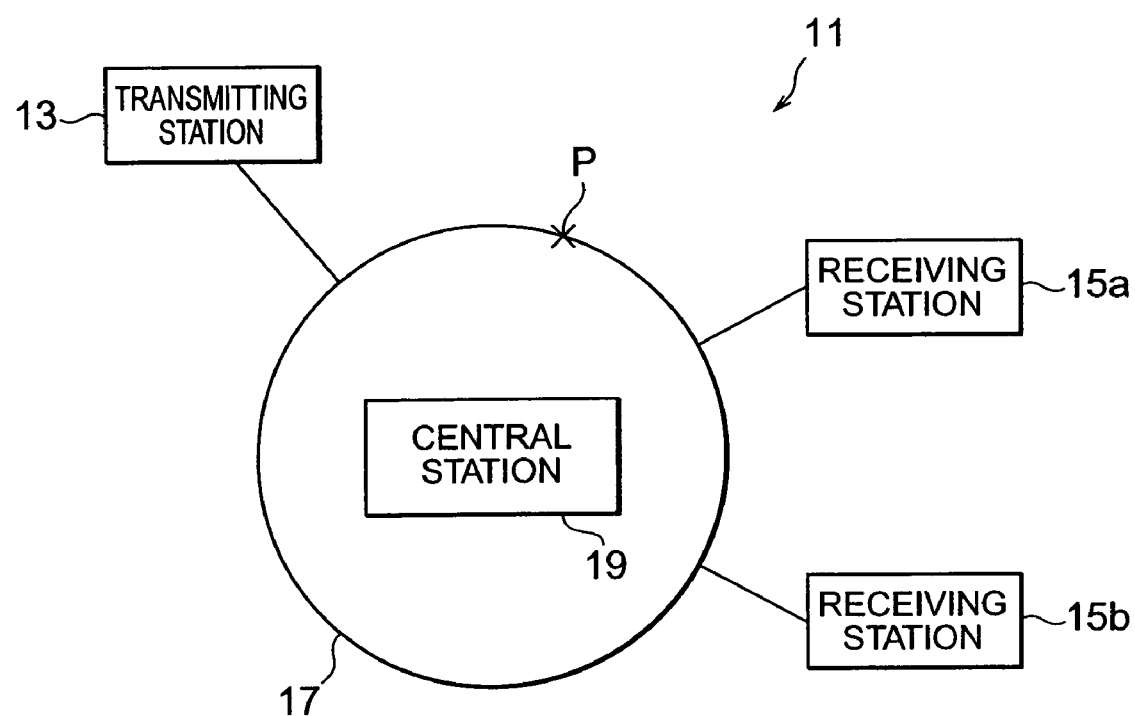
FIG. 1 is a schematic diagram of the optical communications system according to the first embodiment.

An optical communication system 11 according to the present invention is schematically shown in FIG. 1. The optical communication system 11 comprises a transmitting station 13, a receiving station 15, an optical path 17 and a central station 19. The transmitting station 13 involves an optical transmitter. The receiving station 15 involves an optical receiver. The optical path 17 has a ring-shaped configuration and may be an optical fiber.

The central station 19 checks faults occurred on the optical path 17 and traffic of the optical signal transmitted on the optical path 17. The station 19 sends information of the selection of the receiving station to the transmitting station 13, the route to the selected receiving station, and a dispersion amount of the selected route to the transmitting station.

In FIG. 1, one occasion is considered that the optical path 17 is broken at point P when the transmitting station 13 sends information to the receiving station 15a via a clockwise route on the optical path 17. In this case, the central station 19 sends a command to the transmitting station 13 that the route to the receiving station 15a is changed to the counterclockwise path and also sends information of the dispersion amount of the changed route. Although the configuration of the optical path in FIG. 1 is a ring-shaped, it may be applicable to form a mesh-like optical path. Moreover, a two-way communication is realized when the transmitting station has an optical receiver and also the receiving station has an optical transmitter.

Figure 2:
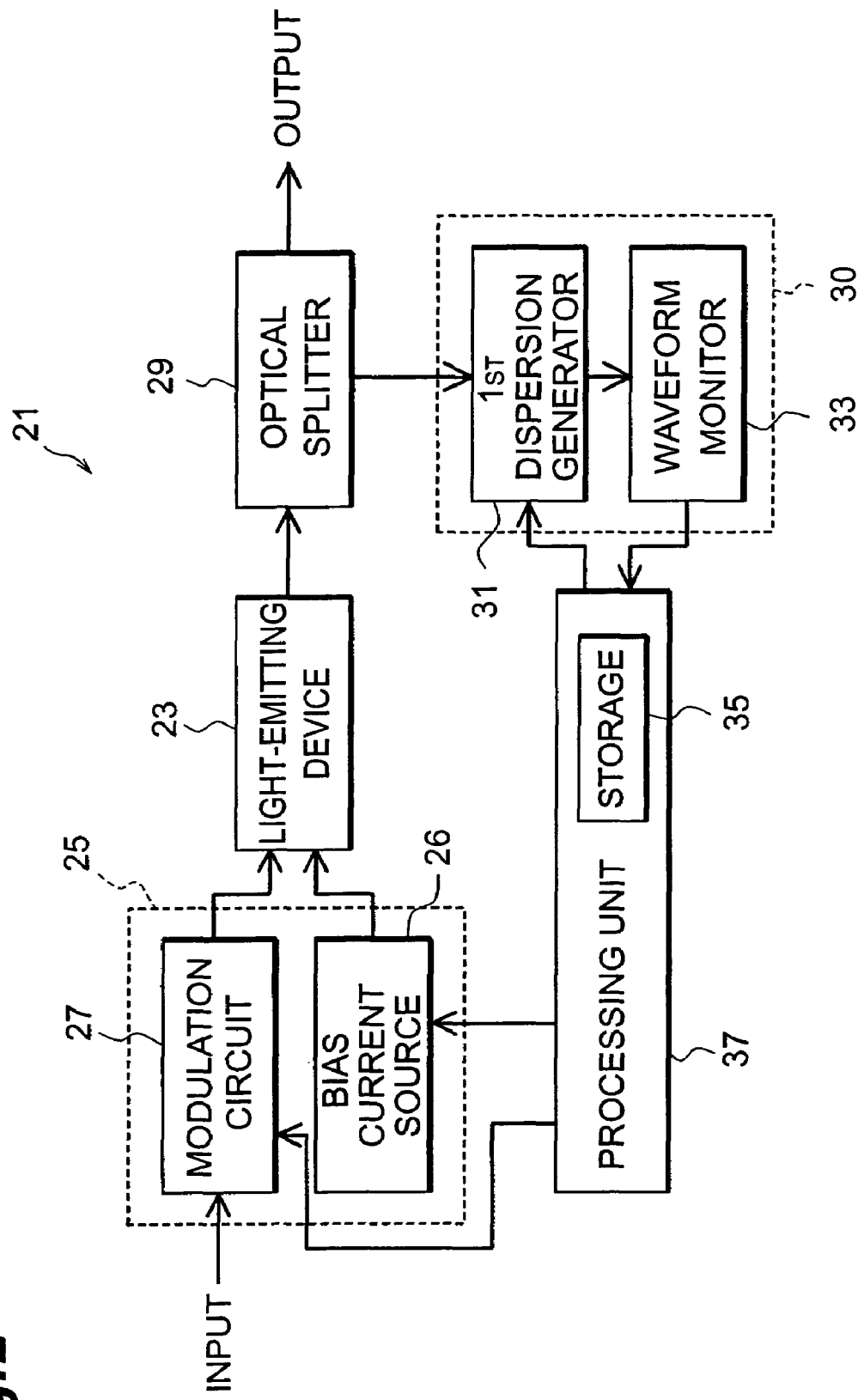
FIG. 2 is a block diagram showing the optical transmitter in the transmitting station.

Next, a configuration of the transmitting station 13 will be explained as referring to FIG. 2. FIG. 2 is a block diagram of an optical transmitter that involved in the transmitting station 13. The optical transmitter 21 comprises a light-emitting device 23, a driver 25 for driving the light-emitting device, a dispersion controller 30, an optical splitter 29, and a processing unit 37. A semiconductor laser diode may be applicable to the light-emitting device 23. The driver 25 includes a bias current source 26 for generating a bias current to the light-emitting device and a modulation circuit 27 for supplying a modulation current and for modulating the light-emitting device 23. The light-emitting device 23 emits light by supplying the bias current and the modulation current.

The optical splitter 29 splits light emitted from the light-emitting device into two optical beams. The dispersion controller 30 comprises a first dispersion generator 31 and a waveform monitor 32. One of the split light is guided to the dispersion generator 31. The dispersion generator 31 adds a preset dispersion, which is set by the processing unit 37 based on a command transmitted from the central station 19, and outputs the modified optical signal to the waveform monitor 33. The eye-diagram of this modified optical signal is monitored by the waveform monitor 33 and checked by the processing unit 37. Typical example of the dispersion generator, which adds a variable dispersion to the input light, is disclosed in U.S. Pat. No. 6,481,861.

The processing unit 37 receives the information of the dispersion amount of the changed route, which is sent from the central station 19, and sets the amount to the dispersion generator 31. Since the dispersion generator 31 is thus preset the dispersion, the waveform monitored in the waveform monitor 33 is equivalent to that received at the receiving station 15. The processing unit 37 checks whether the waveform inspected by the waveform monitor 33 has a predetermined quality or not, and controls the bias current and the modulation current supplied to the light-emitting device 23 through the bias current source 26 and the modulation circuit 27. The feedback control thus explained enables to maintain the quality of the waveform, thereby realizing the predetermined quality for the received signal at the receiving station 15.

Figure 3:
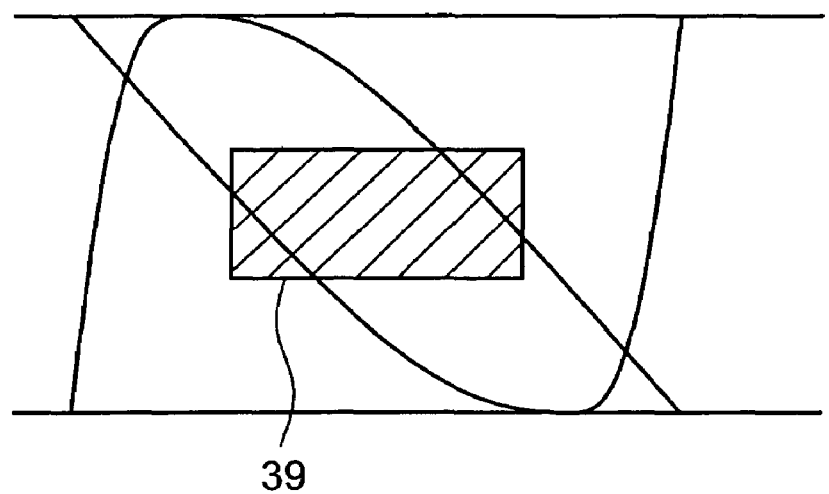
FIG. 3 shows an example of the eye-diagram when the quality of the signal is not secured.
Figure 4:
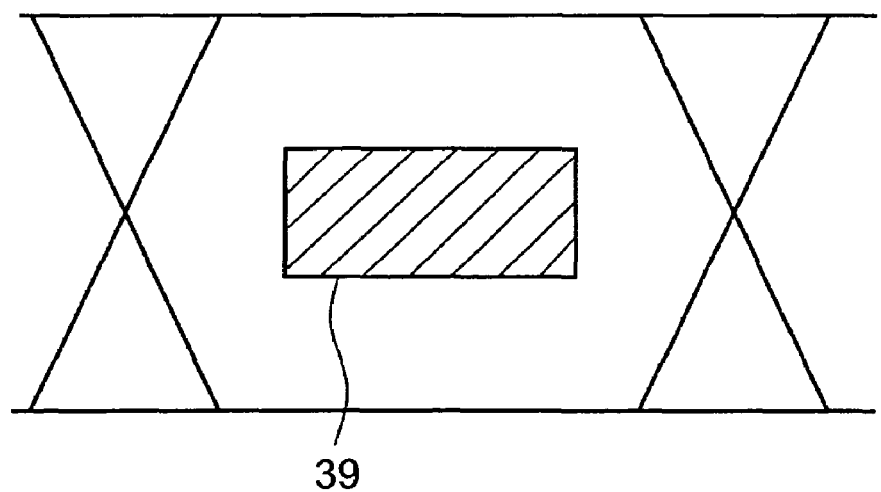
FIG. 4 shows an example of the eye-diagram when the quality of the signal is satisfied.

Next, the quality of the received signal will be explained as referring to FIG. 3 and FIG. 4. FIG. 3 shows an example of the eye-diagram when the quality of the signal is not secured. On the other hand, FIG. 4 shows an example when the quality is satisfied. In FIG. 3, since the opening of the eye-diagram is not enough influenced by the dispersion, a portion of the diagram is overlapped with a quality mask 39 determined by the specification of the optical communication. In FIG. 4, the opening of the eye-diagram is so enough that the diagram does not overlap with the quality mask 39.

The feedback control of the present invention, the first eye-diagram monitored at the waveform monitor 33 is similar to that of FIG. 3 because the preset dispersion is added to the optical signal emitted from the light-emitting device 23. After the feedback control of the bias current and the modulation current, the eye-diagram changes into that shown in FIG. 4.

Figure 5:
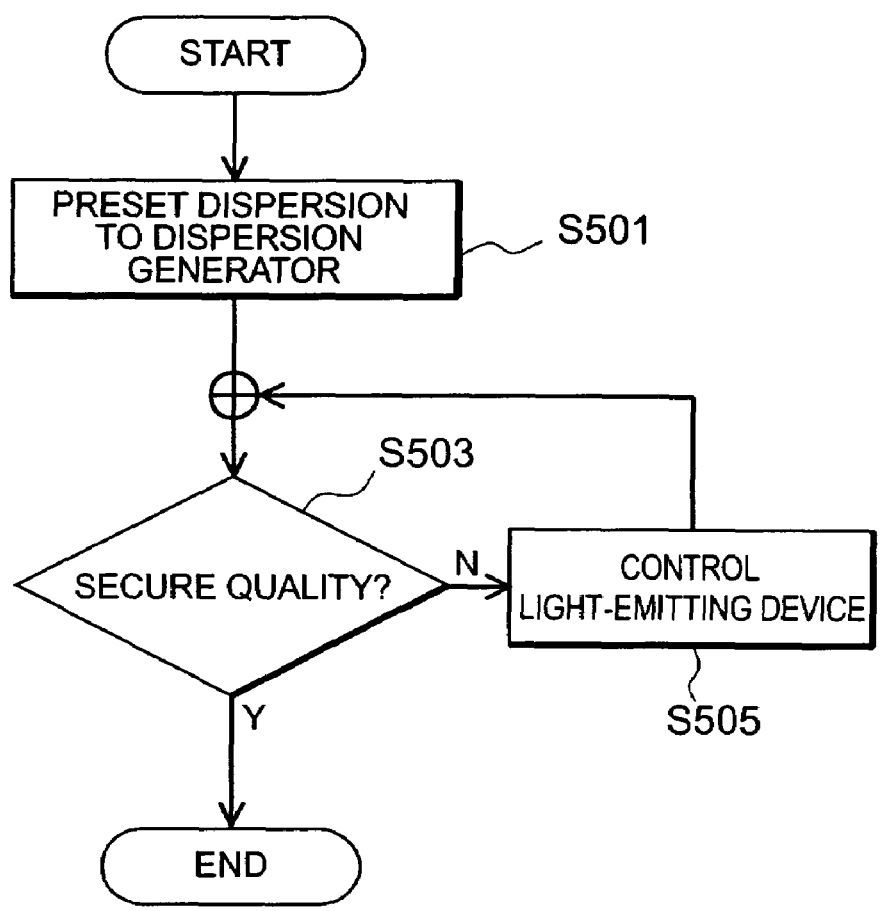
FIG. 5 is a flowchart of the feedback control performed in the optical transmitter.

Next, a flow chart of the feedback control will be described as referring to FIG. 5. FIG. 5 shows a flow chart of the feedback control. In FIG. 5, the following situation is assumed. First, the transmitting station 13 sends information to the receiving station 15a via the optical path in the clockwise direction. Next, the central station 19 instructs the transmitting station 13 to change the route by the counterclockwise direction of the optical path 17, and informs the dispersion amount of the changed route.

After receiving the instruction to change the route and the dispersion amount of the changed route from the central station 19, the processing unit 37 of the optical transmitter 21 sets the dispersion to the dispersion generator 31 in accordance with the instruction at sequence S501. The dispersion generator 31 adds the dispersion to the optical signal split by the optical splitter 29 and outputs the optical signal thus added the dispersion to the waveform monitor 33. The wave form monitor 33 monitors the optical signal as the eye-diagram.

The processing unit 37 checks whether the eye-diagram monitored at the waveform monitor 33 has the predetermined quality or not at sequence S503. This checking is performed by the comparison between the eye-diagram and the mask data 39 stored in the storage 35. When the eye-diagram overlaps with the mask 39 as shown in FIG. 3, the processing unit 37 controls the bias current source to reduce the bias current by a prescribed magnitude, and also controls the modulation circuit so as to reduce the difference between the maximum and the minimum of the modulation current at sequence S505. To decrease the difference of the maximum and the minimum of the modulation current expands the opening of the eye-diagram monitored at the waveform monitor 33. After adjusting the bias current and the modulation current, the control sequence returns to sequence S503. When the opening of the eye-diagram is so enough that any portion thereof does not overlap with the specification mask at sequence S503, which is equivalent to the case that the communication quality is secured, the processing unit 37 does not adjust the bias current and the modulation current of the light-emitting device 23.

The processing unit 37 periodically performs sequences after S503, and once a portion of the eye-diagram overlaps with the specification mask 39, the feedback control described above is performed, thereby maintaining the quality of the eye-diagram monitored at the waveform monitor. The reason why the quality of the eye-diagram monitored at the waveform monitor, which is equivalent to that received at the receiving station, is controlled by the current supplied to the light-emitting device, is the adiabatic chirp of the optical output therefrom depends on the bias current and the modulation current supplied thereto.

Second Embodiment

Figure 6:
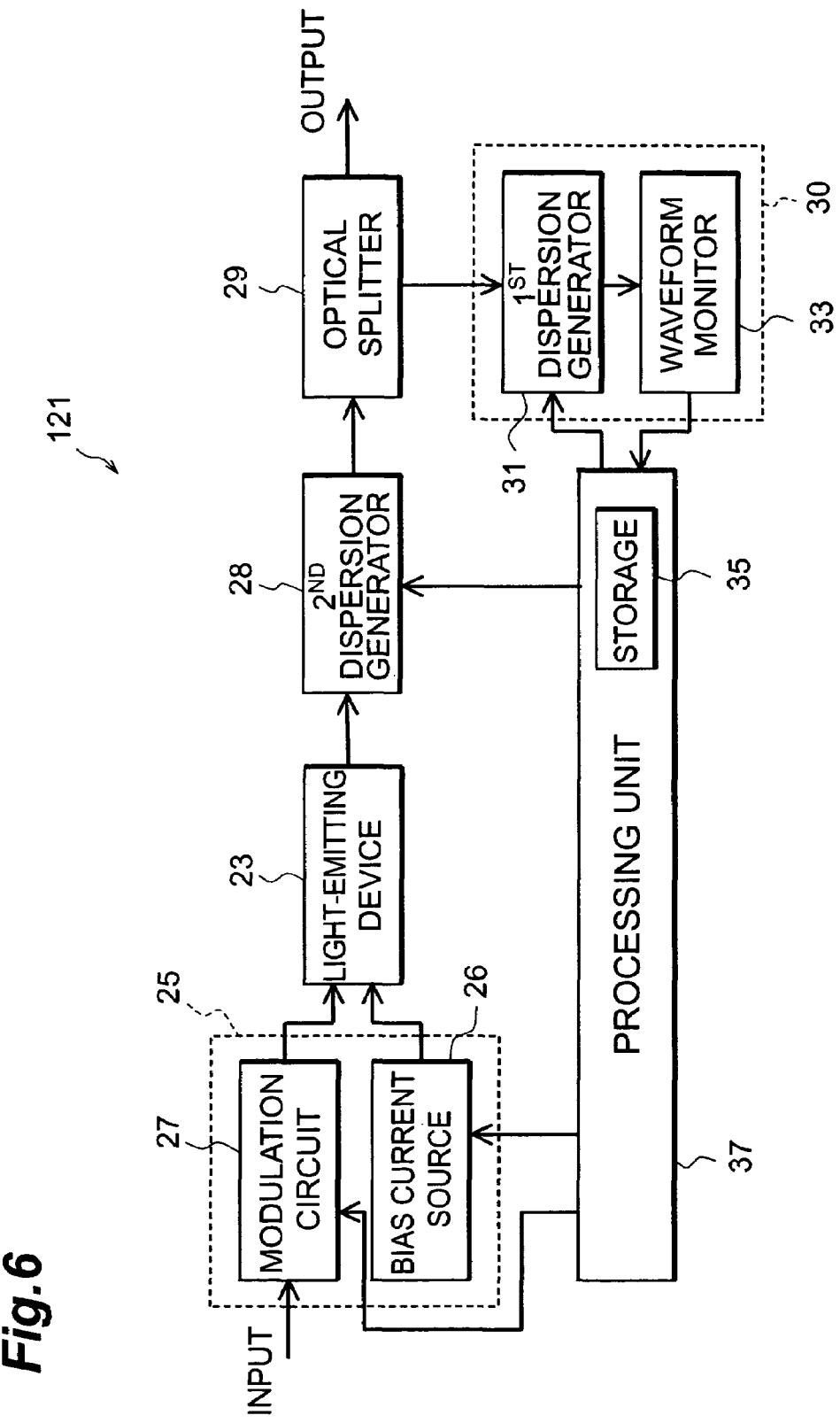
FIG. 6 is a schematic diagram of the optical communications system according to the second embodiment.

FIG. 6 shows a block diagram of an optical transmitter 121 according to the second embodiment of the present invention. The optical transmitter 121 is different to the first embodiment in a point that the second transmitter has a second dispersion generator 28 between the light-emitting device 23 and the optical splitter 29. The second dispersion generator 28 adds dispersion to light output from the light-emitting device 23 and output thus dispersed light to the optical splitter 29.

The optical splitter 29 splits light into two portions, one of which is guided to the first dispersion generator 31. The dispersion amount instructed by the central station 19 is preset to the first dispersion generator. The first dispersion generator adds the preset dispersion to the split light and output thus dispersed light to the waveform monitor 33.

The waveform monitor 30 inspects the input light signal as an eye-diagram and the processing unit 37 checks whether this eye-diagram has a prescribed quality or not. When the quality is not satisfied, the processing unit 37 controls not only the bias current and the modulation current but also the dispersion amount of the second dispersion generator 28. By adjusting the dispersion of the second dispersion generator 28 so as to compensate the dispersion of the first dispersion generator 31, the eye-diagram monitored of the waveform monitor 32 can be maintained within the prescribed quality.

In the first embodiment, the current supplied to the light-emitting device 23 controls the dispersion added to the optical transmitter so as to compensate the dispersion attributed to the changed optical path. However, the case will be encountered that the adjustable dispersion by the current to the light-emitting device 23 is smaller than that due to the change of the optical path. In such a case, a dynamic range of the dispersion control can be expanded by placing the second dispersion generator 28 just after the light-emitting device 23 and adjusting the dispersion amount thereof in addition to the control of the current supplied to the light-emitting device 23.

In the present invention, by presetting the dispersion informed from the central station 19 to the first dispersion generator 31, the wave form monitored at the wave form monitor 33 is equivalent to that received at the receiving station 15a. Therefore, by presetting the quality of the received signal, storing the mask data 39 into the storage 35, and controlling the bias current and the modulation current of the light-emitting device 23 so as to satisfy the quality of the eye-diagram monitored at the waveform monitor 33, the quality of the received optical signal at the receiving station 15a can be maintained. Moreover, by placing the second dispersion generator 28 just after the light-emitting device 23 and controlling the dispersion amount thereof via the feedback control, the quality of the received signal at the receiving station 15a can be maintained.

Although the control of both the currents to be supplied to the light-emitting device 23 and the second dispersion generator 28 is described, the case may be considered that only the second dispersion generator 28 is controlled with in the feedback loop to compensate the dispersion preset in the first dispersion generator 31. In this case, the currents to the light-emitting device 23 adjust only the output power and the extinction ratio thereof.

From the invention thus described, it will be obvious that the invention and its application may be varied in many ways. One alternation is that the storage 35 stores the maximum current and the minimum current to be supplied to the light-emitting device 23, and the dispersion amount when the light-emitting device 23 is supplied such pair of the current. When the transmitter 21 received the dispersion amount from the central station 19, the processing unit 37 reads out the pair of currents corresponding to the dispersion from the central station 19 and controls the bias current source 26 and the modulation current 27.

By this configuration, the feedback control is not necessary because the processing unit 37 directly adjust the bias current and the modulation current based on the dispersion amount sent from the central station 19. Consequently, the optical splitter 29, the dispersion generator 31 and the waveform monitor 33 are not necessary, which not only simplifies the configuration of the optical transmitter 21 but also accelerates the adjusting of the dispersion.

What is claimed is:

1. An optical transmitter, comprising:
   a) a semiconductor laser diode for emitting light by supplying a bias current and modulation current;
   b) an optical splitter for splitting the light emitted from the light-emitting device;
   c) a dispersion controller having a first dispersion generator and a waveform monitor, the first dispersion generator receiving a portion of the light emitted from the light-emitting device and split by the optical splitter, adding a predetermined dispersion to the split light, and outputting dispersed light to the waveform monitor; and
   d) a processing unit for maintaining the dispersed light output from the first dispersion generator to have the predetermined quality by controlling at least one of the bias current and the modulation current supplied to the semiconductor laser diode.

2. The optical transmitter according to claim 1, wherein the waveform monitor monitors the dispersed light as an eye-diagram, and the processing unit defines the predetermined quality in terms of an opening of the eve-diagram.

3. The optical transmitter according to claim 1, further comprising a second dispersion generator for adding a dispersion to the light emitted from the laser diode and outputting dispersed light to the optical splitter, the processing unit controlling the dispersion of the second dispersion generator so as to maintain the dispersed light output from the first dispersion generator to have the predetermined quality.

4. An optical transmission system, comprising:
   a transmitting station having an optical transmitter that includes a semiconductor laser diode for outputting an optical signal by supplying bias and modulation currents;
   a receiving station having an optical receiver;
   at least two optical paths for connecting the transmitting station and the receiving station; and
   a central station for controlling the optical transmission system,
   wherein the central station, when a fault occurs in one of the optical paths connecting the transmitting station to the receiving station and the other of the optical paths is selected, sends information relating to a dispersion of the other of the optical paths to the transmitting station, and
   wherein the optical transmitter outputs a dispersed light so as to compensate the dispersion of the other of the optical paths by controlling one of the bias and modulation currents supplied to the laser diode.

5. The optical transmission system according to claim 4, wherein the optical transmitter further comprises:
   a first dispersion generator for adding the dispersion of the other of the optical paths based on information sent from the central station to a portion of the optical signal output from the laser diode and for outputting a dispersed optical signal; and
   a processing unit for controlling the laser diode so as to compensate the dispersed optical signal output from the first dispersion generator to maintain a predetermined quality by controlling one of the bias and modulation currents.

6. The optical transmission system according to claim 5, wherein the optical transmitter further comprises:
   a second dispersion generator disposed between the laser diode and the first dispersion generator for adding a dispersion to the optical signal output from the laser diode, the first dispersion generator adding the dispersion of the other of the optical paths to a portion of the optical signal output from the second dispersion generator;
   the processing unit controlling the second dispersion generator so as to maintain the dispersed optical signal output from the first dispersion generator to have a predetermined quality.

* * * * *